(12) United States Patent
Ishii

(10) Patent No.: US 6,954,416 B1
(45) Date of Patent: Oct. 11, 2005

(54) SOUND GENERATOR AND METHOD FOR MANUFACTURING THE SAME

(76) Inventor: Tatsuya Ishii, 12-15, Sumiyoshihonmachi 3-chome, Higashinada-ku, Kobe-shi, Hyogo 658-0051 (JP)

(*) Notice: Subject to any disclaimer, the term of this patent is extended or adjusted under 35 U.S.C. 154(b) by 0 days.

(21) Appl. No.: 09/979,014

(22) PCT Filed: May 24, 2000

(86) PCT No.: PCT/JP00/03320
§ 371 (c)(1),
(2), (4) Date: Nov. 15, 2001

(87) PCT Pub. No.: WO00/72304
PCT Pub. Date: Nov. 30, 2000

(30) Foreign Application Priority Data

May 24, 1999 (JP) .......................................... 11/143074

(51) Int. Cl.⁷ ...................... G11B 21/08; G11B 31/00
(52) U.S. Cl. .................. 369/68; 369/30.02; 369/63; 369/64
(58) Field of Search .................. 369/30.02, 63, 369/64, 68, 65, 66, 67; 356/304, 237.5

(56) References Cited

U.S. PATENT DOCUMENTS

| | | |
|---|---|---|
| 2,164,663 A | 7/1939 | Ottofy |
| 2,997,306 A | 8/1961 | Hicks |
| 3,230,824 A | 1/1966 | Schwartz et al. |
| 3,594,937 A | 7/1971 | Luchsinger |
| 3,782,734 A | 1/1974 | Krainin |
| 3,970,803 A | 7/1976 | Kinzie et al. |
| 4,121,835 A | 10/1978 | Garabedian |
| 4,217,807 A | 8/1980 | Nutting et al. |
| 4,381,558 A | 4/1983 | Bearden |
| 4,589,322 A | 5/1986 | Finkenbeiner |
| 4,631,715 A | 12/1986 | Hoover |
| 5,201,837 A | 4/1993 | Lafontaine |

FOREIGN PATENT DOCUMENTS

| | | |
|---|---|---|
| JP | 57-040705 | 6/1982 |
| JP | 58-81702 | 6/1983 |
| JP | 59-22081 | 2/1984 |
| JP | 1-181100 | 12/1989 |
| JP | 05-71899 | 6/1993 |

*Primary Examiner*—George J. Letscher
*Assistant Examiner*—Christopher R. Magee
(74) *Attorney, Agent, or Firm*—Mattingly, Stanger, Malur & Brundidge P.C.

(57) ABSTRACT

A voice and other sounds to be are selected, the sounds are generated and recorded, the sounds are subjected to spectrum analysis and image processing the image-processed and displayed results of spectrum analysis are recorded on a recording medium. By rubbing the printed parts by a finger, sounds are produced.

11 Claims, 9 Drawing Sheets

FIG.2

| CONSONANT CLASSIFICATION | VOICED SOUND | VOICED SOUND | VOICED SOUND | VOICED SOUND |
|---|---|---|---|---|
| FRICTIONAL SOUND | | z | ʒ | |
| FRICATE SOUND | | dz | dʒ | |
| EXPLOSION SOUND | b | d | g | |
| SEMIVOWEL | w | r | j | |
| NASAL SOUND | m | n | | |

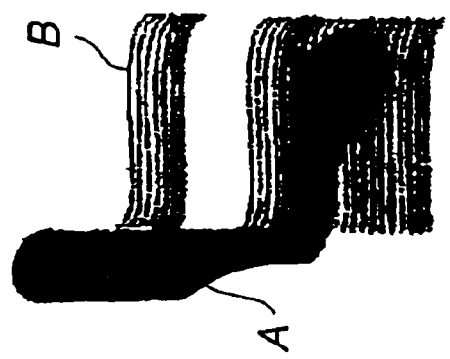
FIG.7(a) s/sh type
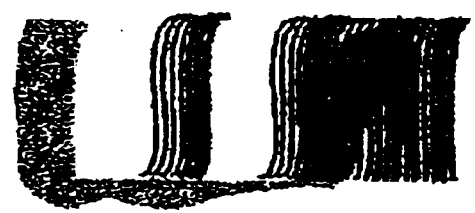
FIG.7(b) t/ts type
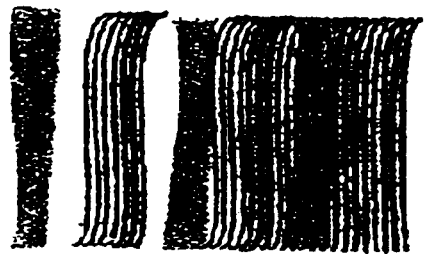
FIG.7(c) k/p/h/f type

SOUND GENERATOR AND METHOD FOR MANUFACTURING THE SAME

FIELD OF THE INVENTION

This invention relates to a sound generator capable of simply reproducing a voice and other sounds, which requires no electronic device, and is extremely simply constituted.

BACKGROUND OF THE INVENTION

Conventionally, as a device for generating sounds, there has been a music box that automatically generates music by clockwork and various electronic melody or voice generators, etc.

However, the conventional voice generator is only for generating sounds, and has a problem that its structure is complex and a high production cost is required, thus it becomes expensive. There is a voice generator that is completely different from the conventional voice generator, formed easily and at a low cost by only adding a simple processing to various articles, moreover everyone can extremely easily generate sounds, and the same has been disclosed in Utility Model laid-Open Publication No. Hei 5-71899.

The voice generator comprises an article with a spatial part capable of resonating sounds and a string body located near by the spatial part, wherein irregular parts, which generate sounds by rubbing it with the top of a nail, etc., are arranged and formed from the side of the spatial part to the side of a clearance edge on the surface of the string body. Sounds are generated from the irregular parts by rubbing it with the top of a nail, etc., and the sounds are amplified by resonance in the spatial part.

However, the above prior art only describes that "Sounds are generated from the irregular parts by rubbing it with the top of a nail, etc.", and discloses nothing on how the voice generator may be structured to generate the requested sounds. In fact, it was found that the act of only establishing the irregular parts could not generate a voice or other requested sounds.

The objective of this invention is to solve such problem and provide a technique capable of generating requested sounds from a sound generator/recording medium with an extremely simple structure that requires no electronic device.

DISCLOSURE OF THE INVENTION

A sound generator/recording medium in connection with this invention is for generating sounds by the vibration of each of the parts where a graphic is drawn, when a vibrating member (a member comparatively easy to vibrate), where a graphic resonating to frequency elements included into a voice and other sounds to be expressed is vibrated. The vibrating member is, for example, a sheet made of paper, plastic, metal or the like, and selected from those that may be vibrated by a simple method such as simply rubbing them with a finger to realize the easy generation of sounds.

A sound generator/recording medium in connection with this invention is characterized in that a voice and other sounds to be expressed are selected, the sounds are generated and recorded, the sounds are subject to spectrum analysis in order to be expressed as images, the image-displayed results of the spectrum analysis are printed and recorded on a recording medium, and by rubbing the surface of the recording medium in a specific direction, sounds are generated. Thereby, an easy generation of sounds are realized.

A method for manufacturing a sound generator/recording medium in connection with this invention comprises the steps of selecting a voice and other sounds to be expressed, generating and recording the sounds, subjecting the sounds to spectrum analysis and expressing the sounds as images, and printing and recording the image-displayed results of the spectrum analysis on the recording medium, and thereby, a simple sound generator can be easily manufactured.

In a method for manufacturing a sound generator/recording medium in connection with this invention, the recording medium is a printable medium such as paper, plastic, metal or the like, and is applicable to a wide range of uses and easy for mass production.

As to images of the above graphics and sounds that are subjected to spectrum analysis, for example, there are images which are expressed by utilizing a commercially-available sound analytical program. In this sound analytical program, sounds are temporally continuously subject to frequency analysis and, in which the vertical axis indicates frequency distribution of sounds and the horizontal axis indicates time. The frequency distribution represents the information of such element as corresponding to a certain frequency. Therefore, images that are subject to spectrum analysis are images where frequency elements are plotted on a chart of frequency and time. Instead of this plot (corresponding to the irregular), the frequency elements may be expressed in gradation. This invention includes both cases.

BRIEF DESCRIPTION OF DRAWINGS

FIG. 2 is an IPA consonant table showing voiced sounds and voiceless sounds that form voices.

In FIG. 7, (a) is a pattern diagram more specifically showing the overlap of voiced sounds and voiceless sounds of the sounds, "sh" line and "s" line, (b) is a spectrum of voiceless sounds of the sounds, "t" line and the sounds, "ts" line, and (c) is a spectrum of voiceless sounds of the sounds, "k" line, "p" line, "h" line and "f" line.

BEST MODE FOR CARRYING OUT THE INVENTION

When irregularities were established on the surface of the plastic plate, etc., and the experiment of whether requested sounds were obtained by rubbing those irregularities with a plastic, etc. was performed, it was found that different sounds could be obtained by establishing the various states of the surface. The sounds obtained in this way are inferior to those reproduced by a tape recorder, etc., in terms of the tone quality, but slightly changes depending on the rubbing method. Thereby, if the requested voices are capable of being expressed, a printing medium can transmit the higher value added information so that novel expressions and demands are prospected.

Figure 1:
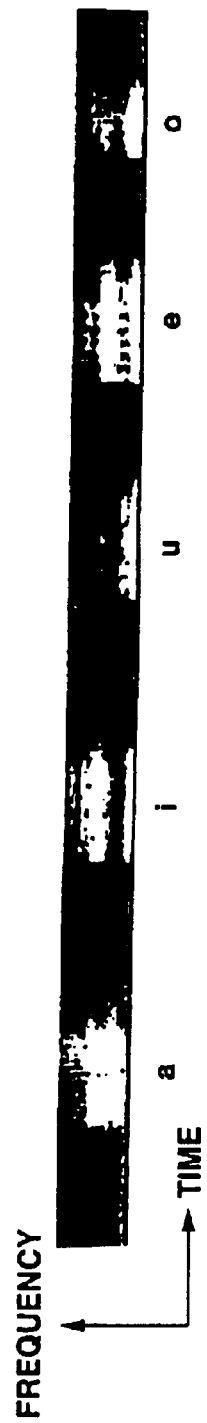
FIG. 1 is an example of a voice spectrum.

Here, a problem is how the irregularities are established so as to generate the requested sounds, and this inventor noted a sound spectrum. Here, for example as shown in FIG. 1, a horizontal axis indicates the passage of time, a vertical axis indicates the frequency, and the gradation represents the frequency elements corresponding to the time. In FIG. 1, the gradation is inverted to show that the frequency elements in the white parts are included in those sounds.

A sound spectrum of the plastic plate and a spectrum of the human voice were compared. The surface of the plastic plate to be used was a corrugated plate whose cycle was approximately 0.5 mm, and the sound generated by rubbing such plate consisted of the frequency band from 600 Hz to 700 Hz. On the other hand, a typical female's voiceprint consists of a harmonic frequency band of 250 Hz, and there are one to three characteristic parts in the band, the color of which becomes darker depending on the strength of the words generated. It is presumed that those parts conform to the main components of the words. Both sound spectrums of the plastic plate and the human voice are common to each other in the view that they are aggregate of the elements of a plurality of sounds. Although the fine texture of those parts in the frequency band are different from each other, the basic structure of the voiceprint form is the same. The main difference is that in the case of the plastic sounds, the band is almost even and there are no characteristic part in the band that shows the strength and weakness of the sounds irrespective of the actual strength and weakness of the sounds.

When the surface of the plastic plate is stuck with a tape, the parts where the sounds rise and the parts where the sounds do not rise are alternately established on the surface at the appropriate interval, and when the surface is rubbed, a spectrum in its own way appears. When a pattern of the spectrum was examined using various materials, it was found that the pattern has a regularity. Therefore, it was noted that by interpreting the frictional sounds as a pattern of images, information of the surface of the plate to be rubbed was reflected to the sound images. As the sounds that a radar hits an object and bounces off such object are output as images, as to the human's voice print, the condition of the vocal code and oral cavity, etc. in generating voices should also be reflected in the image. It is considered that the images that are processed in accordance with the image information of the voiceprint analysis (strong and weak parts of voices) are transferred to the surface of the material, and the distinctive strong and weak parts of the voiceprint are reproduced and output from those images.

Figure 9:
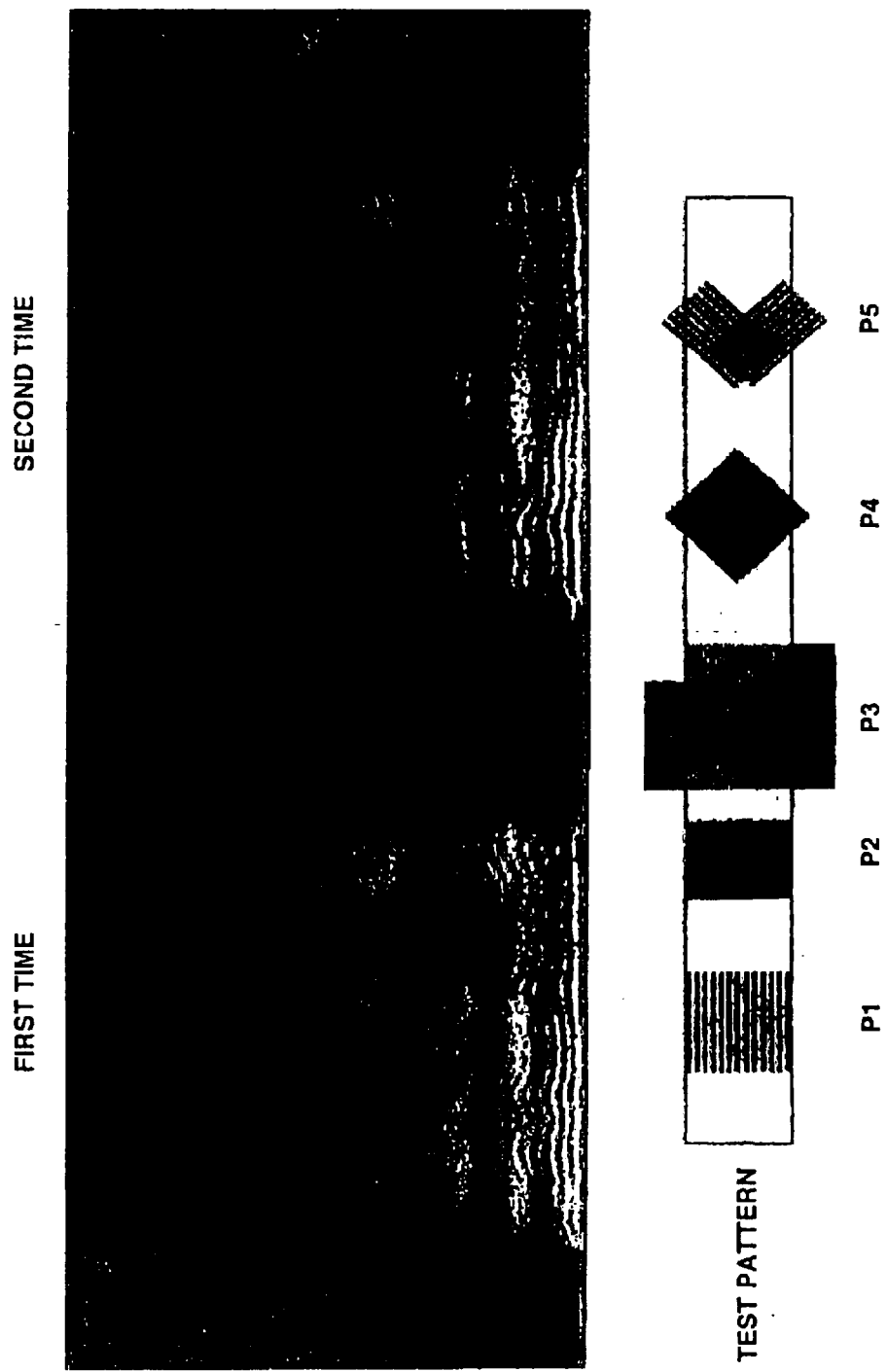
FIG. 9 is a test pattern and a spectrum in the case the test pattern is rubbed twice.

FIG. 9 shows a spectrum in the case that a test pattern, wherein geometrical design patters of P1, P2, P3, P4 and P5 were printed, was rubbed twice. It is found that the patterns are almost the same under both instances. The above indicates that the reproduction of sounds comprising repeatability is allowed.

It can also be understood that when a graphic is drawn in a member comparatively easy to vibrate (hereinafter referred to the vibrating member) by a method of printing, etc, the vibrating characteristics of the part to be drawn changes and the vibrating characteristics resonating to the frequency elements of the voices to be expressed can be obtained by the shape or size of the graphic.

In the part of the voiced sounds, the vibration of the vocal code represented by "aiueo" is a main component, and the voices are characterized by the strength and weakness of a specific part of the frequency band. In theory, sounds can be reproduced if the sound information of the transferred images are exchanged into vibrations. Here, although it is reasonable that the rubbed part vibrates, it was found that, in the case of the plastic plate, the rubbing part was a sound source and the plastic plate hardly vibrated to generate sounds. When various materials were used, it was found that the same frictional sounds arose upon rubbing the surface of the glossy paper with a finger, and contrary to the plastic paper, the paper vibrated (approximately 400 Hz). The generation of sounds by the vibration of the rubbed part also has an advantage in that the frequency band of sounds to be generated can be arranged by changing the density=specific gravity of the materials. When the image-processed sound information was transferred to the surface by using the glossy paper (paper for color printer), which easily causes vibration, to specify the frictional part, and the printed part was vibrated by directly rubbing it with a finger to reproduce the sound, it was confirmed that the voice could be rather faithfully reproduced. The voices used as samples were, two kinds, "aiueo" and "Gokaku Omedeto", and both were vocalized by an adult female voice (approximately 250 Hz). The maximum output ability of the simplest printer is 300 dpi, and as the result of the trial where that the each of the sound images were transferred at the resolutions of four stages—72 dpi, 144 dpi, 200 dpi and 300 dpi, it was confirmed that the reproduced voices became clear in proportion to the resolution.

Figure 8:
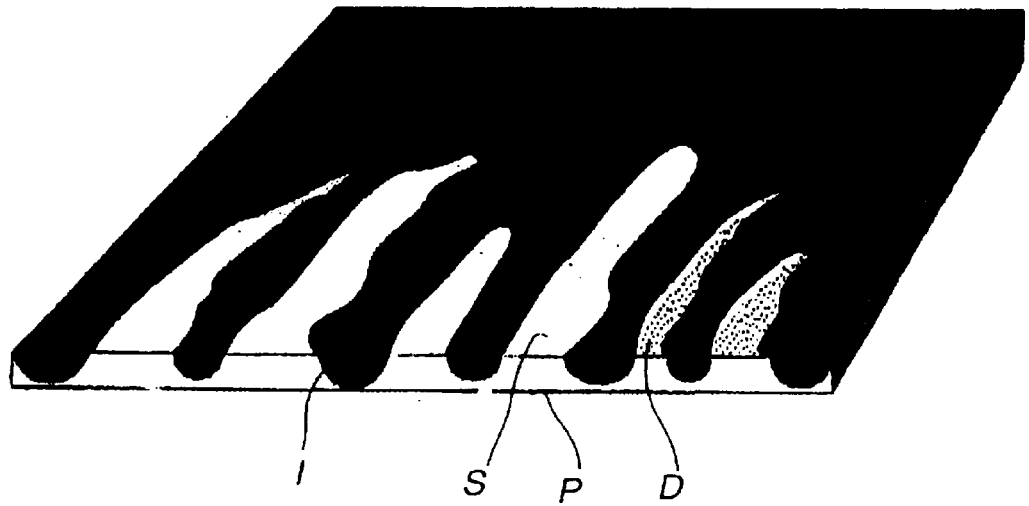
FIG. 8 is a conceptual diagram showing the longitudinal section of a printing paper P (recording longitudinal section of a printing paper P (recording medium), which is glossy with a thickness of 0.3 mm, on which the results of the spectrum analysis are printed by aqueous bubble jet ink.

FIG. 8 is a conceptual diagram showing the longitudinal section of a printing paper P, which is glossy with a thickness of 0.3 mm, on which the results of the spectrum analysis are printed by the aqueous bubble jet ink, and the ink I permeates to the inside from the surface of the paper S. In the part where the ink I is dark (indicated in black), the ink I deeply permeates the paper, and in a part where the ink I is light (indicated in dot D), the ink I barely permeates the paper. Upon rubbing those parts with a finger, the part where the ink I does not permeate (other white parts) is easy to vibrate, and the more deep the ink I permeates, the more difficult it is to cause vibration. That is, the parts where the ink I does not permeate or barely permeates operate as dummy cavities, and the three-dimensional structure emphasizing a characteristic part of a voice spectrum is formed.

Moreover, it could be confirmed that a human finger has the ability to reproduce finer image information beyond expectation. It is considered that when the printing precision arises to the degree of 1200 dpi, clearer sounds can be reproduced.

Generally, a striping of the spectrum at a certain frequency (for example 400 Hz) consists of a frequency of harmonic sound (400×n)Hz (n: integer), and these frequency elements are included in the reproduced sounds. Therefore, a printing pattern where the fundamental tone of 250 Hz is recorded includes the voice spectrum calculated by (250×n) (n: integer) in the frequency band, the audio frequency of which is 250 Hz to 22,050 Hz, and only the required frequency may be extracted from there produced sounds. This is called as a positive process. On the other hand, a method for selecting and deleting the unnecessary spectrum part in accordance with the image information of a voice spectrum (negative process) is also acceptable.

From the above results of the examination, it is preferable to proceed with the following steps.

(1) determining the intended voices and other sounds;

(2) generating and recording those sounds;

According to the results of the experiment, it is desirable to vocalize by explicitly dividing the syllables. Moreover, the voice of a young female is better than that of a male.

(3) subjecting those sounds to spectrum analysis;

FIG. 1 is an example of vocalizing "a, i, u, e, o".

(4) printing the results of the image-displayed spectrum analysis. As a printing method, there are methods such as offset printing or a method for applying by the bubble jet system using the aqueous ink.

The glossy paper (paper for color printer), etc. which can easily be vibrated is used. As the reproduced voices become clear in proportion to the resolution, it is desirable that printing is performed at a preferably high resolution, for example, at the degree of 1200 dpi. Furthermore, in the case of the aqueous ink, it has a characteristic that the lower the percentage of the moisture content is, the less clear the reproduced voices become, on the contrary, in the offset printing where oil based ink is employed, the tone changes little with time.

When the sound apparatus to be printed in this manner is rubbed with a finger, prescribed sounds are reproduced. The direction to be rubbed is the direction of the time axis in FIG. 1. Although the vocalized sounds are substantially different depending on the rubbing method, said sounds can be clearly heard when one becomes accustomed to those sounds.

FIG. 2 is an IPA consonant table showing the voiced sounds and voiceless sounds that form voices. The voiced sounds have a regular frequency band, and the voiceless sounds have no specific frequency.

Furthermore, the voiceless consonants are the consonants without a specific frequency characteristic such as "f/p/s/ts/t/sh/tsh/k/h", etc., and in order to solve such problem, a surface finishing in contrast with the case of the voiced sounds that has no specific frequency and is hard to arise the slip stick phenomenon is conducted to reproduce the scratched sounds that are the sounds to constitute the voiceless consonants. For example, when a paper or printed surface without gloss such as a rough sandpaper, etc. was rubbed, the scratched sounds with very similar characteristics to the generated sounds were obtained.

Figure 4:
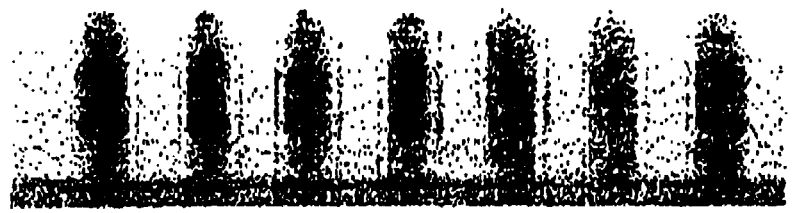
FIG. 4 is a spectrum of frictional sounds made by rubbing a printed surface without gloss.

FIG. 4 shows a spectrum of the frictional sounds made by rubbing the printed surface without gloss.

Figure 5:
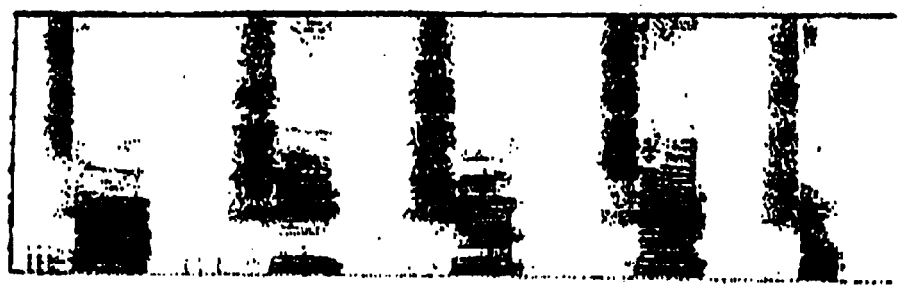
FIG. 5 is a sound spectrum of the sounds of the sh line* by a female voice.

FIG. 5 shows a voice spectrum upon vocalizing the sounds of the sh line in the female's voice. In such spectrum, it is found that "sha" is the overlap of a voiceless sound "sh" and a voiced sound "a", "shi" is the overlap of a voiceless sound "sh" and a voiced sound "i", "shu" is the overlap of a voiceless sound "sh" and a voiced sound "u", "she" is the overlap of a voiceless sound "sh" and a voiced sound "e", and "sho" is the overlap of a voiceless sound "sh" and a voiced sound "o".

Figure 6:
FIG. 6 is an enlarged view showing the details of the spectrum of the sound, "sha".

FIG. 6 is an enlarged view showing the details of the spectrum of the sound, "sha".

FIG. 7(a) is a pattern diagram more specifically showing the overlap of the voiced sounds and the voiceless sounds of the "sh" line and "s" line. Part A which is blacked out in the figure is the spectrum of the voiced sounds and part B which is striped is the spectrum of the voiceless sounds.

According to the experiment where the resolution of printing by the aqueous ink such as bubble jet, etc. was changed from 0.72 dpi to 300 dpi, it was found that the dummy cavities clearly arose immediately after printing with a high percentage of moisture content, and thereafter, they became unclear, thus the reproduced sounds were unclear. In order to solve the problem, when the offset printing employing the oil based ink with more stability was used for production, the following result was obtained.

Figure 3:
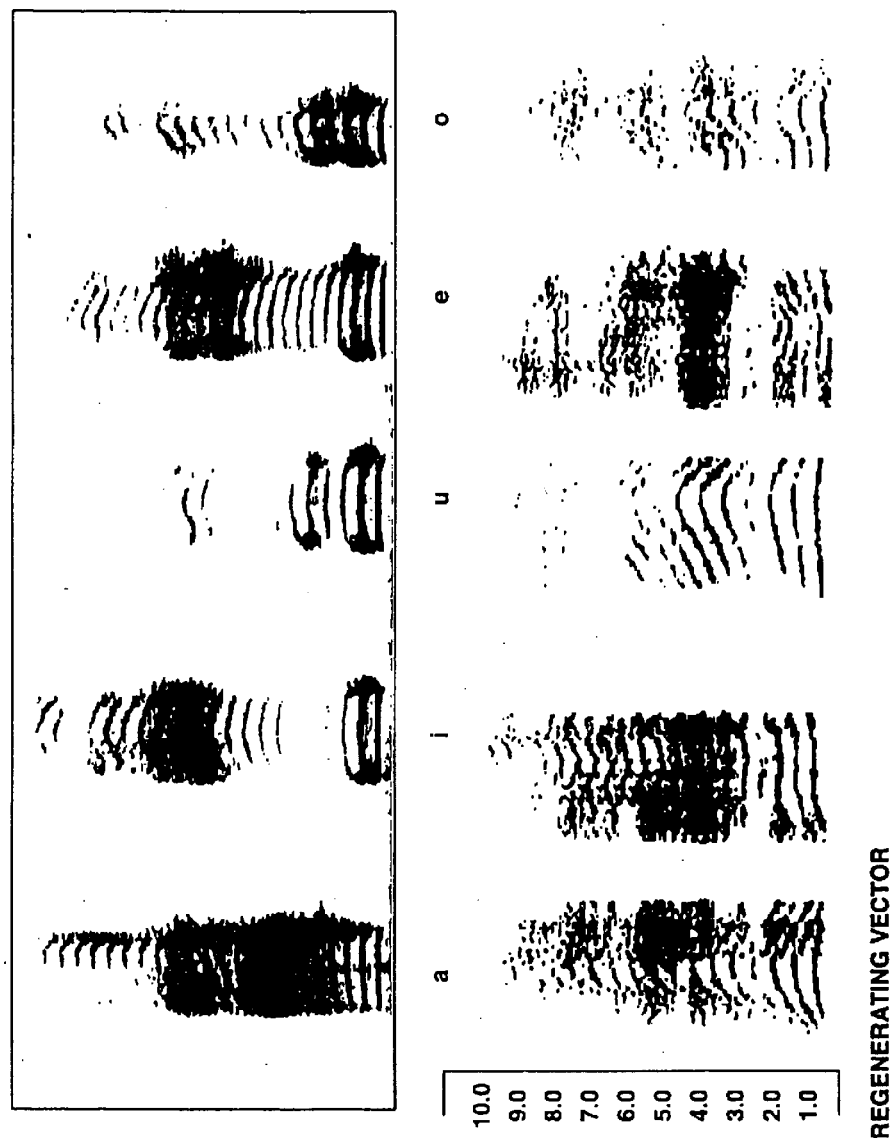
FIG. 3 is a spectrum of the voiced sounds, "a, i, u, e, o" at 250 Hz that are vocalized by a female voice.

FIG. 3(a) is a spectrum of the voiced sounds, "aiueo" at 250 Hz that are vocalized by a female, and FIG. 3(b) is a spectrum of the reproduced sounds upon reproducing the sounds from images in accordance with the image information.

Therefore, in order to maintain the visibility of the reproduced sounds, it is required that some ink element replaced with water is made to permeate to the inside of the printing paper and the structure and elements such as the fiber of the printing paper are settled and stabilized to form a stable three-dimensional structure. As a result, irrespective of the long time lapse (experimentally left indoors for approximately five months), there were no effects such as the vaporization of water, thus stable output results could be obtained.

For the utilization of this invention, the following matters are considered;

(1) Magazine

The sound apparatus is printed on a magazine to provide to readers. For example, in the edge of the magazine, the sound apparatus is printed, and sounds are generated when it is rubbed by the readers.

(2) Ruffle Cartoon

There is a ruffle cartoon where cartoon characters that are slightly different from each other are printed on a number of papers, the papers are bound up, and the movement of the characters can be enjoyed by ruffling the papers, and on the side of the papers the sound apparatus is printed. Movements of the characters can be seen and the sounds can be heard at the same time.

(3) Label of Merchandize for the Blind

For the convenience of the blind, braille or irregular parts are printed on the label of cans. Alternatively, the sound apparatus of this invention can be printed on the label of goods, and by rubbing such part, a specific sound for each of the goods, for example, the brand name can be generated.

Figure 10:
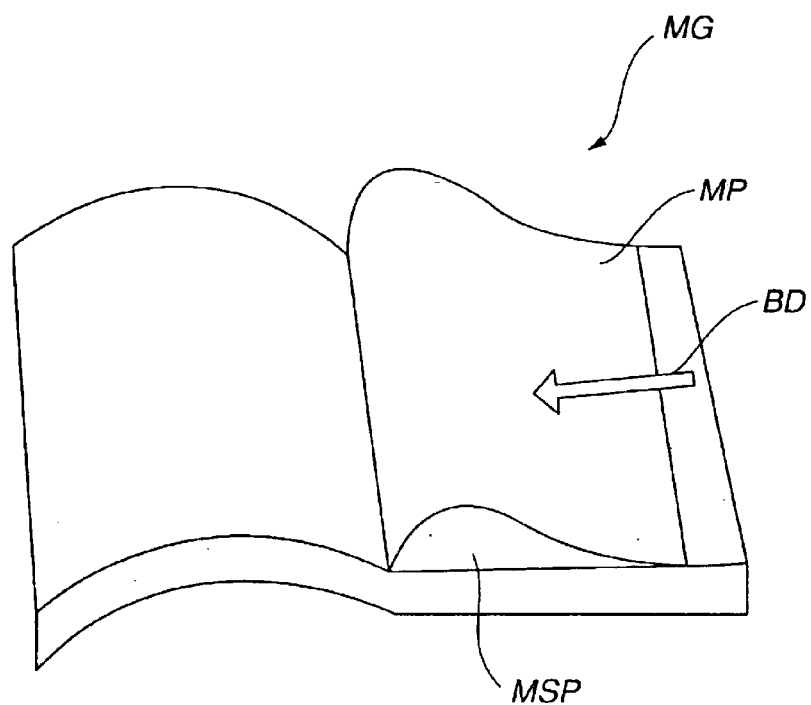
FIG. 10 is a perspective view showing an example of sound generating means.

Moreover, the sound apparatus of this invention can be applied to goods with a spatial part capable of resonating sound, for example, a doll with a hollow waist, a container where goods are stored, a paper box or the like. Furthermore, if the above sound generation was conducted in articles other than solid articles, for example, where a page MP of a magazine MG, etc. was shifted to the direction of the spine BD and distorted, thereby, a space MSP shaped like a megaphone was formed (FIG. 10), a large amount of sound volume could be obtained. Accordingly, an extremely wide range of articles can be extremely easily used as the sound generator of this invention at a low price. Moreover, interest in this invention can be increased by adding the traditional visual agreeableness as well as the newly invented acoustic agreeableness coming from the ears to the wide range of articles, and the information transmitting ability can be improved.

INDUSTRIAL APPLICABILITY

This invention where a sound spectrum is transferred to paper, etc. by printing is capable of being produced extremely easily and at a low cost. Moreover, sounds can easily be generated by only rubbing the sound generating part with a finger, etc.

What ts claimed is:

1. A sound generator having a recording medium, wherein sounds to be expressed are selected, said sounds are generated and recorded, said sounds are subjected to spectrum analysis where frequency elements of said sounds are plotted with respect to frequency and time and represented as images, said images resulting from said spectrum analysis are recorded on said recording medium, and by rubbing a surface of said images on said recording medium in a specific direction, said sounds are generated.

2. The sound generator as claimed in claim 1, wherein said image is a printed plot of the frequency elements resulting from said spectrum analysis.

3. The sound generator as claimed in claim 1, wherein said sounds include voice and said image resulting from said spectrum analysis includes a voice print.

4. A sound generator, comprising:
   at least one graphic on a vibrating member that resonates to generate a sound having frequency elements, wherein said sound has been subjected to spectrum analysis in which said frequency elements are imaged to create the at least one graphic, and
   wherein rubbing a surface of said at least one graphic causes said at least one graphic on said vibrating member to resonate.

5. The sound generator as claimed in claim 4, wherein said at least one graphic is a component of an image of the frequency elements on said vibrating member.

6. The sound generator as claimed in claim 5, wherein said vibrating member is paper and said image is printed on said paper.

7. The sound generator as claimed in claim 4, wherein said at least one graphic has a different frictional characteristic than that of said vibrating member.

8. A sound generator, comprising:
   at least one image recorded on a recording medium that represents a sound that has been subjected to spectrum analysis in which frequency elements of the sound are plotted as a chart of frequency and time to create said image,
   wherein rubbing a surface of said image on said recording medium generates the sound.

9. The sound generator as claimed in claim 8, wherein said image has graphical parts that are of a different frictional characteristic than said recording medium and that are printed on said recording medium.

10. The sound generator as claimed in claim 9, wherein said recording medium is paper and said graphical parts are printed on said paper.

11. The sound generator as claimed in claim 10, wherein said is glossy paper and said graphic elements are of oil based ink printed on said glossy paper.

\* \* \* \* \*